F. PHELPS.
COTTON SEED CLEANER.
APPLICATION FILED SEPT. 14, 1908.
1,005,297.
Patented Oct. 10, 1911.
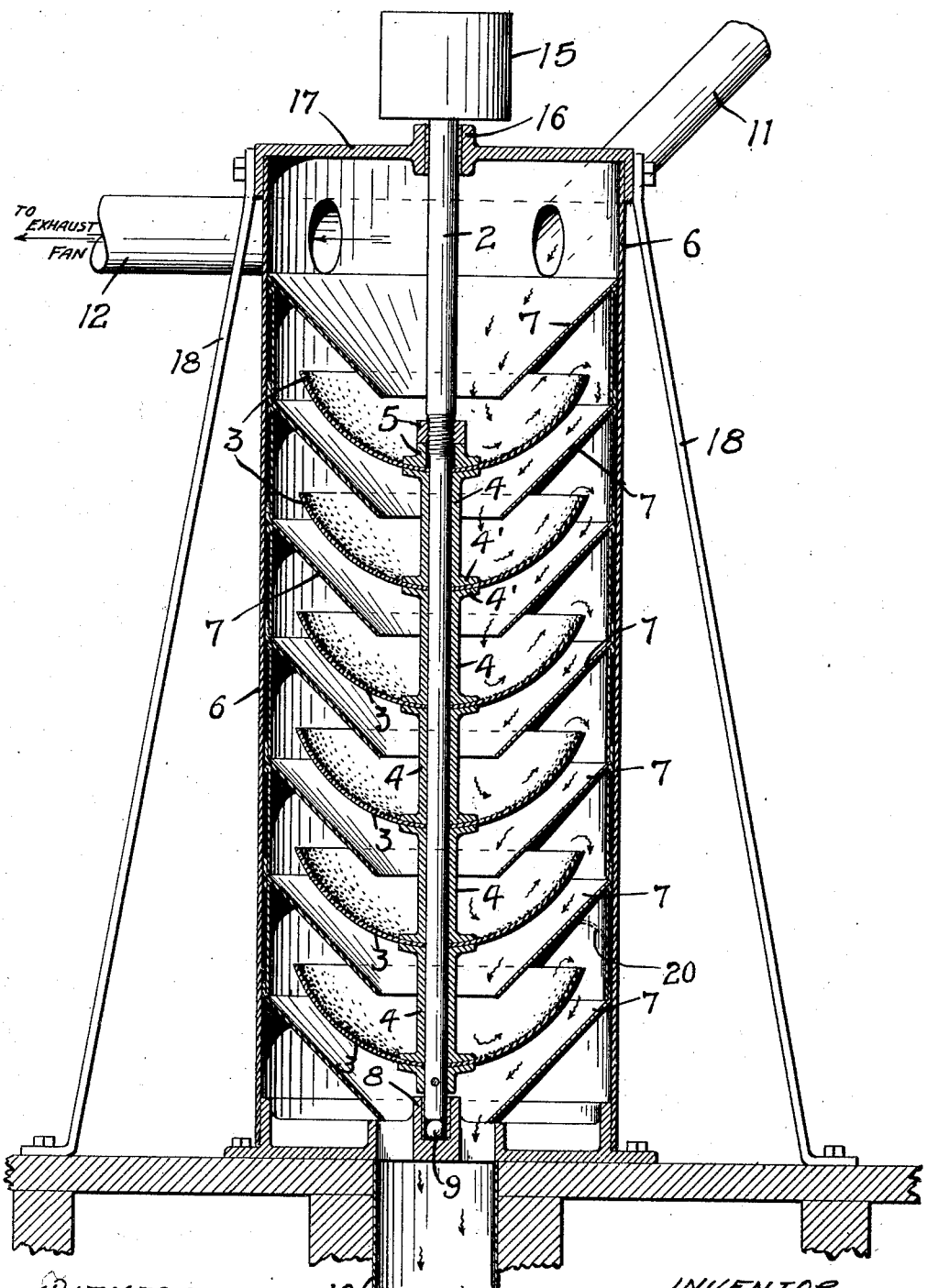
INVENTOR
FRANK PHELPS
BY Paul & Paul
HIS ATTORNEYS

UNITED STATES PATENT OFFICE.

FRANK PHELPS, OF LITTLE ROCK, ARKANSAS, ASSIGNOR OF ONE-THIRD TO ADOLPHUS M. ALLEN, OF MINNEAPOLIS, MINNESOTA, AND ONE-THIRD TO HENRY S. KENNEDY, OF LITTLE ROCK, ARKANSAS.

COTTON-SEED CLEANER.

1,005,297.  Specification of Letters Patent.  Patented Oct. 10, 1911.

Application filed September 14, 1908. Serial No. 452,969.

*To all whom it may concern:*

Be it known that I, FRANK PHELPS, of Little Rock, in the county of Pulaski, State of Arkansas, have invented certain new and useful Improvements in Cotton-Seed Cleaners, of which the following is a specification.

This invention relates to improvements in devices designed for removing the fine particles of lint that adhere to cotton seed after the usual ginning and linting processes have been performed.

It is well known that after the usual ginning and linting processes, there are small particles of lint that adhere to cotton seed. It has heretofore been found very difficult to remove these particles from the seed and it is found to be objectionable to use the seed while the particles remain thereon.

The object of my invention is to provide a simple mechanism by means of which the fine particles of lint adhering to the cotton seed may be rapidly and effectively removed.

The invention consists generally in a rotatable shaft provided with one or more dish or cup-shaped disks secured to and rotating with said shaft and provided upon the concave surface thereof with suitable abrading material and means for rotating the shaft and the disk or disks connected thereto whereby the cotton seed fed into the disks near the central portion thereof, will be caused to travel by centrifugal force outward over the abrasive surface of the disk and will finally pass over and fall from the edge of the disk.

The invention consists further in the constructions and combinations hereafter described and particularly pointed out in the claims.

The accompanying drawing, forming part of this specification, is a vertical section of a device embodying my invention in a simple form.

In the drawing, 2 represents a suitable shaft arranged in an upright position and having its lower end preferably mounted in a step bearing 8 where it may, if preferred, rest upon an anti-friction ball or roller 9. The shaft is preferably provided with a driving pulley 15 and the upper end of the shaft is preferably arranged in a suitable bearing 16 formed upon or secured to a plate 17 that is supported by a series of braces 18.

I arrange upon the shaft 2, and secure thereto in any suitable manner, one or more dish or cup-shaped disks 3. I have here shown the device provided with a series of these disks, but I do not limit myself to any number of such disks as the invention may be practiced with a single disk only. I have here shown these disks secured to the shaft by being arranged between suitable sleeves 4 having flanges 4' and all of said sleeves and disks being clamped together by suitable nuts 5 engaging a threaded portion of the shaft 2. The inner surface of each disk 3 is preferably formed with an abrasive surface, consisting preferably of sand, emery, carborundum, or similar material secured to the concave surface of the disk in any suitable manner. The shaft and disks are preferably inclosed in a suitable jacket or casing 6 and a hopper 7, having an open central portion, is arranged in this jacket above each of the disks 3. A feed spout 11 leads into the casing above the upper hopper 7. A spout 10 leads from the lower part of the device and is adapted to receive the material passing through the lower hopper 7.

I may, if preferred, attach a suction pipe 12 to the upper part of the casing 6 and provide any suitable means for creating an air current through the casing to carry away the light material that is removed from the speed in the operation of the machine.

I have shown the series of hoppers 7 each provided with a conical portion, above which is a cylindrical wall, the upper end of which forms a support for the next hopper above and I consider this a convenient way in which to form and support the hoppers, but I do not limit myself to any particular means for supporting the hoppers, or any particular form thereof. I may, if preferred, form the upper edge of each member with an inwardly curved portion, as represented by dotted lines at 20 in the drawing and I may provide upon this curved wall of the hopper and, in fact, upon any portion of the hopper wall an abrasive surface similar to that upon the concave wall of the rotatable disks. In that case, the seed that is thrown out of the dish-shaped disk may strike against this abrasive surface on the wall of the hopper and be subjected to a further cleaning action thereby.

Operation: The cotton seed, or other material, to be cleaned, is fed into the casing into the upper hopper through the pipe 11 and passes through said hopper to the central portion of the cup or dish-shaped disk 3. The shaft and disk being rotated, the cotton seed is caused to travel by centrifugal force outward and upward over the surface of the disk 3 and as it moves over the abrasive surface of said disk, the fine lint adhering thereto will be removed. The cotton seed will finally reach and pass over the edge of the disk and into the next hopper. If only one disk is used, the seed will pass from this hopper into the exit spout 10. As I usually employ a series of disks, the seed will be carried by the second hopper to the central portion of the second disk, where the operation will be repeated and this will continue as many times as there are disks upon the shaft.

Where an air current is used passing through the machine in the opposite direction to the passage of the seed, the light material removed by the machine will be taken up by the air current and carried out through the pipe 12.

I do not limit myself to any exact form of the dish or cup-shaped disks as the form of such disks may be varied without departing from my invention.

I claim:

1. The combination, with a rotatable shaft, of a dish-shaped disk secured thereto with its concave face upward and provided upon its upper concave surface with abrasive material, and means for creating a current of air upward from below the disk and downward and upward above the disk, substantially as described.

2. The combination, with a rotatable shaft, of a dish-shaped disk secured thereto with its concave face upward and provided upon its upper concave surface with abrasive material, means for feeding cotton seed, or other material to be operated upon, to the central portion of said disk, and means for rotating the shaft and disk and thereby causing the material being operated upon to travel by centrifugal force upward over the concave surface of said disk and to pass therefrom over its edge, substantially as described.

3. The combination, with a rotatable shaft and means for rotating the same, of a series of dish-shaped disks secured to said shaft with their concave surfaces upward and each provided upon its upper concave surface with abrasive material, means for feeding the material that passes over the edge of each disk to the central portion of the next succeeding disk, and means for creating a current of air upward from below and downward and upward above each of the several disks, substantially as described.

4. The combination, with a rotatable shaft and means for rotating the same, of a series of dish-shaped disks secured to said shaft with their concave faces upward and each provided upon its upper concave surface with abrasive material, a series of hoppers having open central portions interposed between said disks, each hopper being arranged to receive material from the outer edge of the disk above and to conduct it to the central portion of the disk below, and means for creating a current of air upward from below and downward and upward above each of the several disks, substantially as described.

5. The combination, with a rotatable shaft, and means for rotating the same, of a series of dish-shaped disks secured to said shaft, with their concave faces upward and each provided upon its upper concave surface with abrasive material, a series of hoppers interposed between said disks and arranged to direct the material passing over the edge of each disk to the central portion of the next succeeding disk, and means for creating a current of air upward from below and downward and upward above each of the several disks, substantially as described.

In testimony whereof, I have hereunto set my hand this 10th day of September 1908.

FRANK PHELPS.

Witnesses:
  C. G. HANSON,
  J. A. BYINGTON.

---

Copies of this patent may be obtained for five cents each, by addressing the "Commissioner of Patents, Washington, D. C."